United States Patent [19]

Munn et al.

[11] Patent Number: 4,700,368
[45] Date of Patent: Oct. 13, 1987

[54] METHOD AND APPARATUS FOR SENSING SHEETS

[75] Inventors: Ernest A. Munn; John A. Skinner, both of Hants, England

[73] Assignee: De La Rue Systems Limited, England

[21] Appl. No.: 810,651

[22] Filed: Dec. 18, 1985

[30] Foreign Application Priority Data

Dec. 21, 1984 [GB] United Kingdom ............... 8432438

[51] Int. Cl.$^4$ .................. B65H 7/04; G01B 7/06; G01D 3/02
[52] U.S. Cl. ............................. 377/8; 377/39; 324/230; 340/674; 33/147 L; 271/263
[58] Field of Search .............. 377/8, 39; 324/230, 324/231, 207, 208; 340/674, 675; 33/147 L; 271/263

[56] References Cited

U.S. PATENT DOCUMENTS

| | | | |
|---|---|---|---|
| 3,020,473 | 2/1962 | Cauley | 377/8 |
| 3,219,992 | 11/1965 | Stuchbery et al. | 340/674 |
| 3,249,860 | 5/1966 | Huggins | 324/231 |
| 3,515,555 | 5/1970 | Vachon | 324/231 |
| 3,826,487 | 7/1974 | Forster et al. | 340/675 |
| 3,857,095 | 12/1974 | Mitchie et al. | 324/230 |
| 4,068,189 | 1/1978 | Wilson | 324/208 |
| 4,136,454 | 1/1979 | Jenkins et al. | 33/147 L |
| 4,284,961 | 8/1981 | Landau | 324/208 |
| 4,420,747 | 12/1983 | Kistner | 340/674 |
| 4,513,430 | 4/1985 | Vora et al. | 377/39 |

FOREIGN PATENT DOCUMENTS

0130825 1/1985 European Pat. Off.
WO82/01698 5/1982 PCT Int'l Appl.

OTHER PUBLICATIONS

"An Improved Magnetic Reluctance Transducer for the Measurement of Thin Lubricant Film Thickness" by S. Y. Poon, Journal of Physics, vol. 3, Jul. 1970.

*Primary Examiner*—John S. Heyman
*Attorney, Agent, or Firm*—Ostrolenk, Faber, Gerb & Soffen

[57] ABSTRACT

Apparatus for sensing the passage of sheets (1) through a nip formed by rollers (5 and 6), includes means for sensing the deflection of one roller relative to the other, the sensing means including an oscillator (18) providing a train of signals the frequency of which varies with the amount of the relative deflection of the rollers, and a counter (19) counting the signals from the oscillator in a fixed time interval. Means (23) are provided for storing counts representing the relative deflections of the rollers in a cycle of movement of the rollers when no sheet is present, and for comparing the difference between a subsequent count and a stored count for a corresponding position in the cycle of rotation of the rollers, with a predetermined threshold, to establish the presence or absence of a sheet between the guide members. The sensing means may comprise a core (14), moving with the shaft of one of the rollers, and a solenoid (15) connected to the oscillator circuit.

9 Claims, 5 Drawing Figures

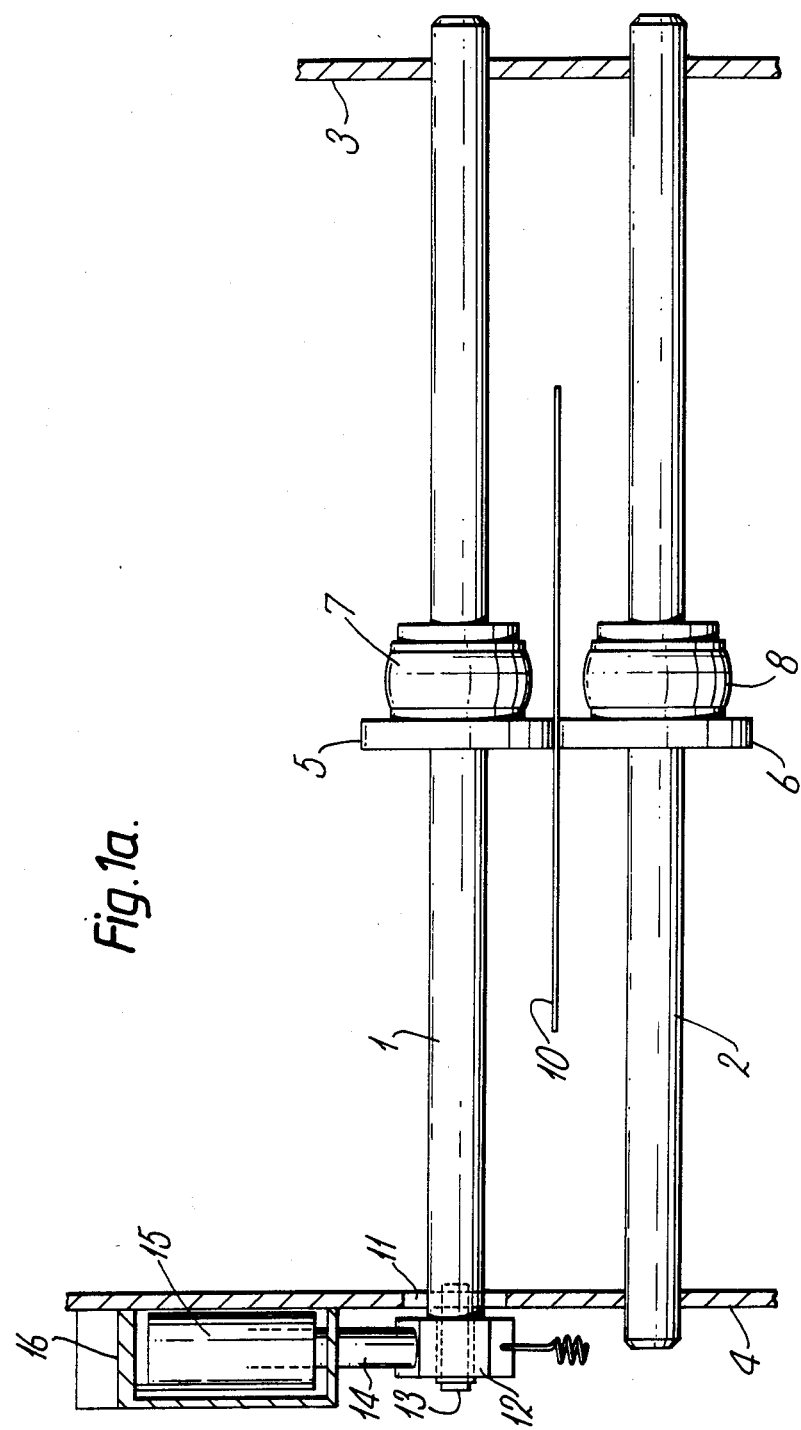

4,700,368

METHOD AND APPARATUS FOR SENSING SHEETS

BACKGROUND OF THE INVENTION

This invention concerns a method and apparatus for sensing the passage of sheets through a nip between a pair of guide rollers by sensing the relative deflection of the guide rollers during the passage of a sheet through the nip.

One example of such a method and apparatus is shown in Published International (PCT) Patent Application WO-A-82/01698. In this example, a sheet passes under a roller which is connected to a linear variable differential transformer. A signal representing the change of signal from the sensor in response to the passage of an expected thickness of a sheet is preset and to this is added a signal representing the datum value obtained from the sensor when the roller rests on a guide surface. When a note passes through the nip, the output signal is fed to a comparator, which also receives the expected thickness signal and the datum value, the comparator determining whether or not a sheet is present. Between the passage of successive sheets through the nip, the datum value is rechecked and a suitable correction is made if necessary.

Such an arrangement works well if the rollers and the shafts on which they are mounted are made with high mechanical precision but it is expensive to achieve such precision. The problem which arises when the roller and shaft system is not of high mechanical precision is that the "noise" level of the sensor output is comparable to the signal level corresponding to the passage of a single note, particularly for the thinner currencies. The object of the present invention is to achieve good results in sheet sensing with a roller and shaft system which is built to a lower precision and is consequently less costly.

BRIEF DESCRIPTION OF THE INVENTION

Apparatus according to a first aspect of the invention, for sensing the passage of sheets through a nip, comprises:

a pair of guide members whose surfaces define said nip, said guide members being moveable in a cyclic manner to advance said sheets through said nip and being displaceable with respect to one another as a function of the thickness of one or more sheets passing through said nips;

sensing means for sensing a deflection of said guide members relative to one another and for generating a train of signals whose frequency varies as a function of the amount of relative deflection of said guide members;

counter means for generating n present count values for each cycle of movement of said guide means, n being an integer greater than 1, each present count value being representative of the number of signals generated by said sensing means during a respective sampling interval corresponding to a respective portion of said surface of said guide members;

storing means for storing n no-sheet count values for a single cycle of movement of said guide members, each no-sheet count value representing the relative deflection of said guide members with respect to one another when no sheet is present between said nip for a respective one of said different portions of said surface of said guide members so that each of said no-sheet count values corresponds to a respective one of said present count values;

comparing means for comparing, for each cycle of movement of said guide members, each present count value with its corresponding no-sheet count value and for generating a respective difference signal for each said comparison; and determining means for obtaining an average of said difference signals for each said cycle of movement of said guide means and for comparing said average with a predetermined threshold value to determine the presence or absence of a sheet in said nip.

Preferably, the determining means includes means first and second threshold values, the second threshold value being greater than the first threshold value, the determining means determining that a single sheet is located in the nip when the difference signal lies between the two threshold values and determines that at least two sheets are located in the nip when the different signal exceeds the second threshold value.

Such apparatus reduces the required mechanical precision, so that the components are less expensive and the apparatus is simpler to construct. The frequency-based system, in which each count effectively averages amplitude variations over a short, defined period, is less susceptible to spurious noise than a similar amplitude-based system.

The sensing means may, for example, be a solenoid with a core which follows the relative deflection of the guide members. In such a construction, there is a very wide setting tolerance for the position of the solenoid relative to the core. Electrical and mechanical drift can be compensated in the microprocessor arrangements.

In the preferred form, the frequency of the signal from the signal generator and the counter capacity are such that the counter in effect overflows. In other words, the high-order data bits are ignored and the changes in the low-order bits are used in the signal processing. The use of a high frequency signal and overflow enhances the linearity of the system, so that it is no longer essential to employ a "linear transformer" as a sensor.

In the preferred method embodying the invention, calibration is effected automatically, so that it is not necessary to have prior knowledge of the standard thickness of the documents to be dispensed.

The method of the present invention comprises the steps of:

passing one or more sheets through a pair of guide members whose surfaces define a nip, the guide members being moveable in a cyclic manner to advance said sheets through said nip and being displaceable with respect to one another as a function of the thickness of one or more sheets passing through said nip;

sensing a deflection of said guide members relative to one another and generating a train of signals whose frequency varies as a function of the amount of relative deflection of said guide members;

generating n present count values for each cycle of movement of said guide means, n being an integer greater than 1, each present count value being representative of the number of signals generated by said sensing means during the respective sampling interval corresponding to a respective portion of said surface of said guide members;

storing n no-sheet count values for a single cycle of movement of said guide members, each no-sheet count value representing the relative deflection of said guide members with respect to one another when no sheet is present between said nip for a respective one of said different portions of said surface of said guide members so that each of said no-sheet count values corresponds to a respective one of said preset count values;

comparing, for each cycle of movement of said guide members, each present count value with its corresponding no-sheet count value and for generating a respective difference signal for each said comparison; and obtaining an average of said difference signals for each said cycle of movement of said guide means and for comparing said average with a predetermined threshold value to determine the presence or absence of a sheet in said nip.

BRIEF DESCRIPTION OF THE DRAWINGS

In order that the invention may be better understood, an example of apparatus embodying the invention will now be described with reference to the accompanying drawings, in which:

FIG. 1a is a view in front elevation of the sheet feeding apparatus and sheet sensor;

FIG. 1b is a view in end elevation of the apparatus shown in FIG. 1a;

DETAILED DESCRIPTION OF THE PREFERRED EMBODIMENT

Figure 1B:
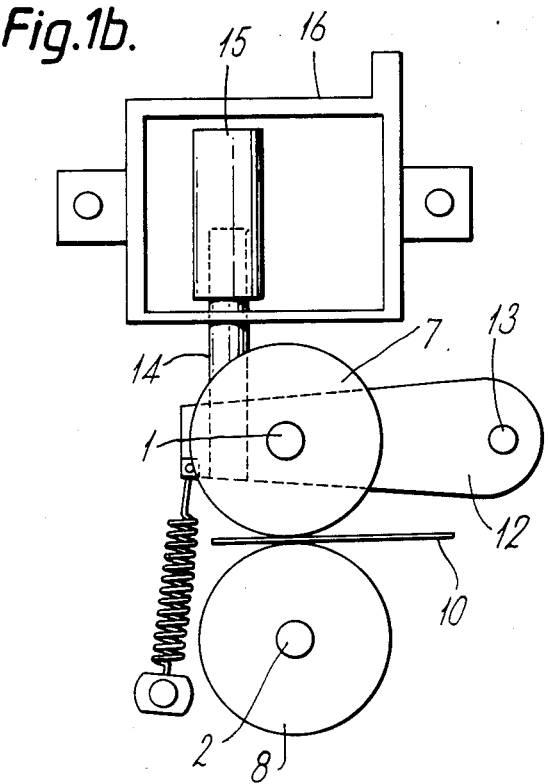

The sheet feeding apparatus shown in FIGS. 1a and 1b comprises two parallel shafts 1 and 2 mounted between side plates 3 and 4. The shaft 1 is the sensor shaft and carries a guide member or roller 5 and the shaft 2 is the datum shaft and carries a guide member or roller 6. The rollers 5 and 6 are freely mounted for rotation on the shafts and are driven in rotation by belts 7 and 8. A sheet 10 fed through the system passes between the rims of rollers 5 and 6. The diameters of the rollers 5 and 6 is such as to cause the belts 7 and 8 to be spaced from one another at the sensor station but elsewhere in the apparatus the belts contact the sheets and constitute the sheet transport means.

The datum shaft 2 is fixed in the side plates 3 and 4 and the right-hand end of the shaft 1 is fixed in the side plate 3. However, at its other end, the sensor shaft 1 passes through a hole 11 in the side plate 4 and is mounted for rotation in an arm 12. The arm 12 is mounted at one end on a pivot 13 attached to the side plate 4. A core 14, cooperating with a solenoid 15, is mounted in the other end of the pivoted arm 12, i.e. remote from the pivot 13. The solenoid 15 is fixed in a housing 16 attached to the side plate 4.

It will be clear that when a sheet passes between the cooperating rollers 5 and 6 on the shafts 1 and 2, the sensor shaft 1 will move away from the datum shaft 2 and this will result in movement of the free left-hand end of the shaft 1, causing angular movement of the arm 12 about the pivot 13 and consequent movement of the core 14 into the solenoid 15.

The passage of two superimposed sheets between the cooperating rollers 5 and 6 results in a greater separation of the shafts and a greater penetration of the core 14 into the solenoid 15.

The movement of the core into the solenoid changes the inductance of the solenoid.

Figure 2:
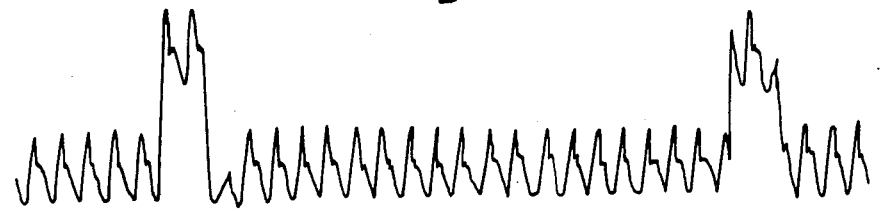
FIG. 2 is a typical waveform obtained using apparatus of the kind shown in FIG. 1.

FIG. 2 is a typical waveform obtained from such a sensor. The small-amplitude variations indicate, in analogue equivalent form, the variable frequency pattern produced by the sensor due to the eccentricity of the pinch rollers. Thus, the periodic pattern corresponds to the composite profile of the pinch rollers in one revolution.

It will be seen from FIG. 2 that when a note passes between the pinch rollers the waveform pattern is offset by an amount corresponding to the thickness of the note but the offset pattern suffers little distortion.

Figure 3:
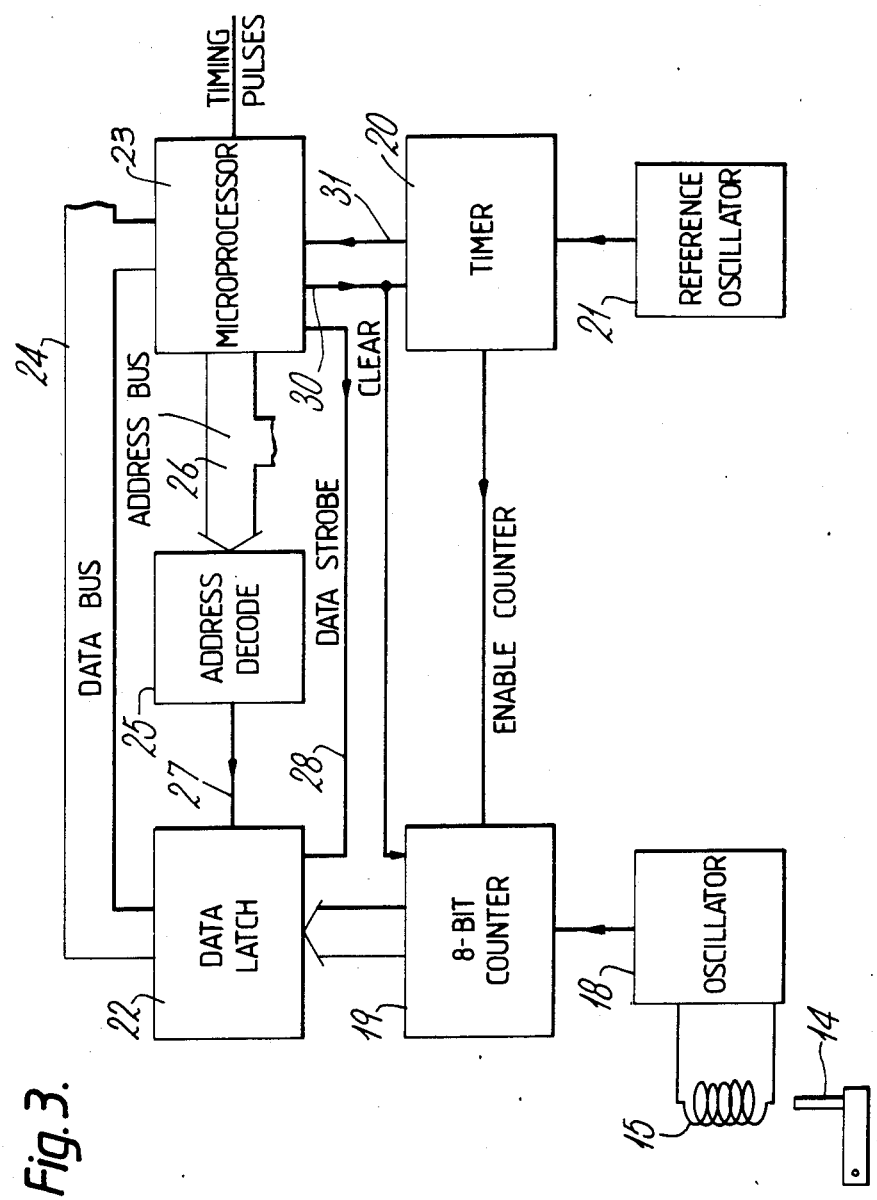
FIG. 3 is a block diagram of the electronic apparatus for processing the output of the sensor in FIG. 1.

As shown in FIG. 3, the solenoid 15 is connected to an oscillator circuit 18 which varies in frequency as a function of the penetration of the core into the solenoid. An eight-bit counter 19 receives the oscillator output and counts the number of pulses present in a predetermined period or time "window". Thus, the count during such a period represents the degree of penetration of the core 14 into the solenoid 15 and therefore the relative deflection of the rollers. The duration of the predetermined period or time "window" during which the count is made is predetermined by a timer 20 supplied with pulses by a crystal-controlled reference oscillator 21

The count in counter 19 is fed to a data latch circuit 22 and thence then over a data bus 24 to a microprocessor 23 which is responsible for monitoring the counts and detecting the presence of a single sheet or multiple sheets. Since the data bus carries other data at other times, when the microprocessor requires data from the latch circuit it sends a suitable address signal over an address bus 26 to an address decode circuit 25 which signals the data latch circuit 22 over a line 27. The microprocessor 23 also supplies a data strobe signal over line 28 to the data latch circuit 22.

Figure 4:
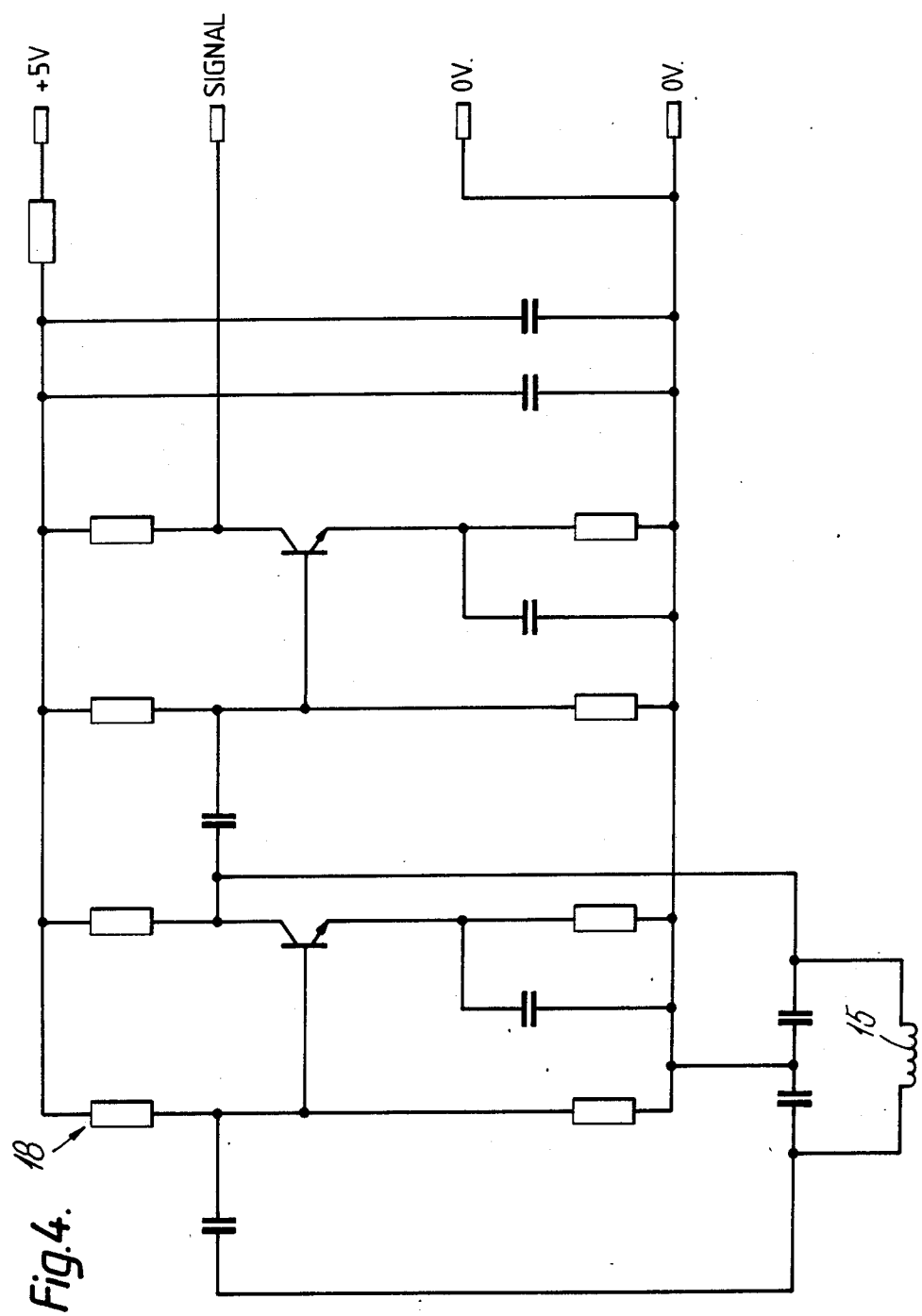
FIG. 4 shows an oscillator circuit for use in the block diagram of FIG. 3.

The circuit shown in FIG. 4 consists of an oscillator, the frequency of which depends upon the inductance of the solenoid 15, and a buffer, and is of conventional design.

In the example described, the oscillator operates at 10 MHz and the duration of the sampling period or time "window" is such that the count obtained is greater than eight bits. However, the high-order data bits (those in excess of eight) are ignored and only the changes in the lower-order bits are used in the signal processing algorithm. This increases the resolution which can be obtained.

The pinch rollers 5, 6 and a timing wheel (not shown) are driven by the main transport for the notes, producing thirty timing pulses per revolution of the pinch rollers. These timing pulses define thirty sampling points in each revolution of the rollers. At each timing pulse, the microprocessor supplies a "clear" signal over line 30 to clear the 8-bit counter and the timer 20. The timer 20 then counts the pulses from oscillator 21 and the counter 19 counts the pulses from the oscillator 18. When the timer 20 overflows it stops the counter 19 and sends a "data ready" signal over line 31 to the microprocessor 23. The microprocessor 23 then addresses the data latch 22 and acquires the data reading, as described above.

To generate and store the eccentricity profile of the rollers prior to the arrival of a note, the microprocessor 23 samples the signal from the sensor at each of the thirty sampling instants and retains each sample value in a memory location. To smooth out the effects of random noise on the sampled values, a further reading is taken for each sample point and the value in the memory is replaced by the weighted average of the existing value in the memory and the new sample value for that point, the weighting of the average being towards the existing value in memory. However, before the average is calculated the existing value in memory is subtracted from the sample value and the result is then compared with threshold values which represent one-half the thickness value of a single note and one and one-half of that thickness value, respectively. If either of these threshold values is exceeded, the average is not calculated.

The note threshold values are determined by a calibration note-dispensing operation, during which notes are dispensed into a reject container. The microprocessor 23 determines a thickness value for each dispensed note by averaging the thickness counts obtained for the entire note length (after subtraction of the values representing the roller profile). When the thickness values obtained for two notes are substantially the same, that value is accepted for the calculation of threshold values. If there is disagreement between the thickness values of the first two notes, even after allowance has been made for thickness tolerances and measurement inaccuracy, then extra notes are fed until there is agreement between the values obtained for the thinnest pair of notes. The number of calibration notes is limited, in this example, to nine notes; if there is still no agreement, a false condition is indicated.

When the thickness value for a single note has been thus established, single and double-note thickness thresholds are calculated. The single note threshold may, for example, be one-half of the single-note thickness and the double-note threshold may be one and one-half of the single note thickness.

Thereafter, when a note is fed through the rollers 5 and 6, the count from the data latch at each sampling instant (i.e. at each timing pulse) is compared by the microprocessor with the stored count for the roller profile for the corresponding angular position of the rollers. The difference is noted for each sampling instant during the passage of the note and these differences are averaged to obtain the mean thickness of the note. The mean thickness is compared with the pre-established thresholds.

In the preferred method, the gap between successive notes is such as to correspond to at least one revolution of the pinch rollers, enabling the entire pinch roller profile in the memory to be updated. This overcomes the problem which would otherwise arise due to the fact that the signal pattern will change with time, due to a gradual phase shifting between the pinch rollers.

Although it is possible that the above calibration procedure would set a threshold based on the thicknesses of two double notes, the probability is extremely low. If this occurred, during a normal dispensing operation a single note might not be detected when it was fed to the apparatus; this would be interpreted as a feed failure. However, another sensor is provided to detect such notes and this sensor would initiate a new calibration dispensing operation.

Once the initial calibration dispensing operation has been carried out, recalibration takes place only if there has been an interruption of the power supply, a resetting of the microprocessor, or a change of note denomination takes place, or an error condition occurs such that the calibration is suspected of being faulty.

Further thresholds may be established in the microprocessor if desired. For example a threshold lower than the normal single note threshold may be used to define the lower end of a range (of which the upper end is the normal single note threshold) indicative of the presence of a sheet which is too thin. Similarly, a further lower range may indicate that no sheet is present but that the variations due to the roller profiles are too great.

We claim:

1. Apparatus for sensing the passage of sheets through a nip, said apparatus comprising:

a pair of guide members whose surfaces define said nip, said guide members being moveable in a cyclic manner to advance said sheets through said nip and being displaceable with respect to one another as a function of the thickness of one or more sheets passing through said nip;

sensing means for sensing a deflection of said guide members relative to one another and for generating a train of signals whose frequency varies as a function of the amount of relative deflection of said guide members;

counter means for generating n present count values for each cycle of movement of said guide members, n being a integer greater than 1, each present count value being representative of the number of signals generated by said sensing means during a respective sampling interval corresponding to a respective portion of said surface of said guide members;

storing means for storing n no-sheet count values for a single cycle of movement of said guide members, each no-sheet count value representing the relative deflection of said guide members with respect to one another when no sheet is present between said nip for a respective one of said portions of said surface of said guide members so that each of said no-sheet count values corresponds to a respective one of said present count values;

comparing means for comparing, for each cycle of movement of said guide members, each present count value with its corresponding no-sheet count value and for generating a respective difference signal for each said comparison; and determining means for obtaining an average of said difference signals for each said cycle of movement of said guide means and for comparing said average with a predetermined threshold value to determine the presence or absence of a sheet in said nip.

2. Apparatus in accordance with claim 1, in which said determining means compares the average of said difference signals to said first and second threshold values, said second threshold value being greater than said first threshold value, said determining means determining that a single sheet is located between said nip when said difference signal lies between said two threshold values and determining that at least two sheets are located in said nip when said difference signal exceeds said second threshold value.

3. Apparatus in accordance with claim 1, in which said guide members are rollers.

4. Apparatus in accordance with claim 3, in which one of said rollers is mounted on a fixed shaft and the other of said rollers is mounted to permit its displacement relative to said shaft of said first roller.

5. Apparatus in accordance with claim 1, in which said sensing means includes a solenoid and a core so mounted that relative displacement of said guide members by the passage of a sheet causes relative movement of said core and solenoid, and in which said solenoid is connected to said signal generator and controls the frequency of said signal generator in accordance with the degree of penetration of said core into said solenoid.

6. A method for sensing the passing of sheets through a nip, said method comprising the steps of:

passing one or more sheets through a pair of guide members whose surfaces define a nip, the guide members being moveable in a cyclic manner to advance said sheets through said nip and being displaceable with respect to one another as a function of the thickness of one or more sheets passing through said nip;

sensing a deflection of said guide members relative to one another and generating a train of signals whose frequency varies as a function of the amount of relative deflection of said guide members;

generating n present count values for each cycle of movement of said guide members, n being an integer greater than 1, each present count value being representative of the number of signals generated by said sensing means during the respective sampling interval corresponding to a respective portion of said surface of said guide members;

storing n no-sheet count values for a single cycle of movement of said guide members, each no-sheet count value representing the relative deflection of said guide members with respect to one another when no sheet is present between said nip for a respective one of said different portions of said surface of said guide members so that each of said no-sheet count values corresponds to a respective one of said preset count values;

comparing, for each cycle of movement of said guide members, each present count value with its corresponding no-sheet count value and for generating a respective difference signal for each said comparison; and obtaining an average of said difference signals for each said cycle of movement of said guide means and for comparing said average with a predetermined threshold value to determine the presence or absence of a sheet in said nip.

7. A method in accordance with claim 6 wherein said comparing step compares said average of said difference signals with first and second threshold values, said second threshold value being greater than said first threshold value, and determines that a single sheet is located in said nip when said average is located between said first and second threshold values and determines that one or more sheets are located in said nip when said average is located above said second threshold value.

8. A method in accordance with claim 6, in which the frequency of said train of signals, the length of said sampling intervals, and the capacity of said counter means are such that said counter means overflows, whereby only the lower-order bits of the count are considered.

9. A method in accordance with claim 6, comprising setting said threshold value by a calibrating operation in which sheets are passed in sequence through said nip and the resulting counts, after compensation with reference to a corresponding no sheet count, are checked for agreement, and in which when substantially the same value is obtained for two sheets that value is used in the calculation of said predetermined threshold value.

* * * * *